United States Patent [19]

Dezubay et al.

[11] Patent Number: 4,780,271
[45] Date of Patent: Oct. 25, 1988

[54] PROCESS AND APPARATUS FOR BURNING GASES CONTAINING HYDROGEN AND FOR COOLING RESULTING COMBUSTION GASES

[75] Inventors: Egon A. Dezubay, Mt. Lebanon; Philip J. Lain, Wilkins Township, Allegheny County, both of Pa.

[73] Assignee: Westinghouse Electric Corp., Pittsburgh, Pa.

[21] Appl. No.: 782,859

[22] Filed: Oct. 2, 1985

[51] Int. Cl.⁴ .......................... G21C 9/00; C01B 5/00
[52] U.S. Cl. ..................................... 376/300; 423/580
[58] Field of Search ................. 376/300; 422/200; 423/580

[56] References Cited

U.S. PATENT DOCUMENTS

| | | | |
|---|---|---|---|
| 3,362,883 | 1/1968 | Wright | 376/300 |
| 3,755,075 | 8/1973 | Henrie | 423/580 |
| 3,791,923 | 2/1974 | Bhan | 376/300 |
| 3,853,482 | 12/1974 | Bhan | 376/300 |
| 3,859,053 | 1/1975 | Parnes | 423/580 |
| 3,937,796 | 2/1976 | Bhan . | |
| 4,008,050 | 2/1977 | Betz | 422/200 |
| 4,014,984 | 3/1977 | Parnes | 423/580 |
| 4,091,871 | 4/1977 | Anderson et al. . | |
| 4,139,603 | 2/1979 | Weems et al. | 376/300 |
| 4,228,132 | 10/1980 | Weems et al. | 376/300 |

FOREIGN PATENT DOCUMENTS 0046246 8/1981 Fed. Rep. of Germany .

Primary Examiner—Deborah L. Kyle
Assistant Examiner—Richard W. Wendtland
Attorney, Agent, or Firm—D. C. Abeles

[57] ABSTRACT

Process and apparatus for heating a gaseous mixture from a nuclear reactor containing hydrogen and air to its ignition temperature to convert hydrogen to water vapor and then cooling the resultant gaseous mixture after heating to a temperature below its ignition temperature prior to discharging the resultant gaseous mixture from the apparatus.

17 Claims, 2 Drawing Sheets

PROCESS AND APPARATUS FOR BURNING GASES CONTAINING HYDROGEN AND FOR COOLING RESULTING COMBUSTION GASES

FIELD OF THE INVENTION

This invention relates to a process, and apparatus therefor, wherein a gaseous mixture from a nuclear reactor containing hydrogen and air is heated to its ignition temperature in a hydrogen recombiner, the resulting gaseous combustion product, which is substantially above the said ignition temperature, is cooled below said ignition temperature, and the cooled gaseous product is then discharged from said hydrogen recombiner.

BACKGROUND OF THE INVENTION

It is common to burn a mixture of containment gases (gases within the housing surrounding a nuclear reactor) containing hydrogen and air from nuclear power plants by passing said gaseous mixture through a hydrogen recombiner wherein said gaseous mixture is heated to its ignition temperature to convert, by oxidation, the hydrogen therein to water before discharging the resulting recombined gases from the hydrogen recombiner. When the hydrogen content of the containment gases is small, for example, up to about 4 volume percent, the conversion of hydrogen to water results in an increase in the temperature of the resulting recombined gases further above the ignition temperature of the containment gases. However, by the time the resulting recombined gases are discharged from the hydrogen recombiner, the temperature thereof has normally fallen below the ignition temperature of the containment gases. Therefore, there is no chance that the resulting recombined gases upon discharge from the hydrogen recombiner will give rise to spontaneous combustion of containment gases external of the hydrogen recombiner. However, in the event the concentration of hydrogen in the containment gases continues to rise above about 4 volume percent, for example, upwardly to about 8 to 10 volume percent, burning of such gases in the hydrogen recombiner to convert all of the hydrogen therein to water vapor will result in steadily increasing temperatures of the resultant recombined gases substantially above the ignition temperature of the containment gases. Even though the temperature of the latter resultant recombined gases may still be cooled somewhat before discharge from the hydrogen recombiner, the temperature thereof will still be in excess of the ignition temperature of the containment gases. Therefore, when they are discharged from the hydrogen recombiner, the will give rise to spontaneous combustion of containment gases external of the hydrogen recombiner.

We have found that the above difficulties can be overcome, even when mixtures of containment gases containing up to about 8 to 10 volume percent hydrogen are burned in a hydrogen recombiner and the recombined gases have a temperature in excess of their ignition temperature prior to discharge from the hydrogen recombiner, by cooling the exit gases to a temperature level below their ignition temperature after said burning but before discharging them from the hydrogen recombiner. Our discovery also relates to apparatus for obtaining the above results.

SUMMARY OF THE INVENTION

A gaseous mixture from a nuclear reactor containing hydrogen and air is heated to its ignition temperature in a hydrogen recombiner, the temperature of the resultant gaseous product rises above said ignition temperature, the resultant gaseous product is cooled to a temperature below said ignition temperature and is then discharged from the hydrogen recombiner. Our invention also comprises novel apparatus for carrying out our novel process claimed herein.

DETAILED DESCRIPTION

The novel apparatus herein is a hydrogen recombiner which comprises means for heating containment gases from a nuclear power plant comprising a gaseous mixture containing hydrogen and air to their ignition temperature to convert hydrogen by oxidation to water vapor, the temperature of the resulting gaseous mixture thereby rising to a level in excess of said ignition temperature before discharging from the hydrogen recombiner, means for cooling the resultant gaseous mixture to a temperature below said ignition temperature and means for discharging the cooled resultant gaseous mixture from the hydrogen recombiner.

Figure 1:
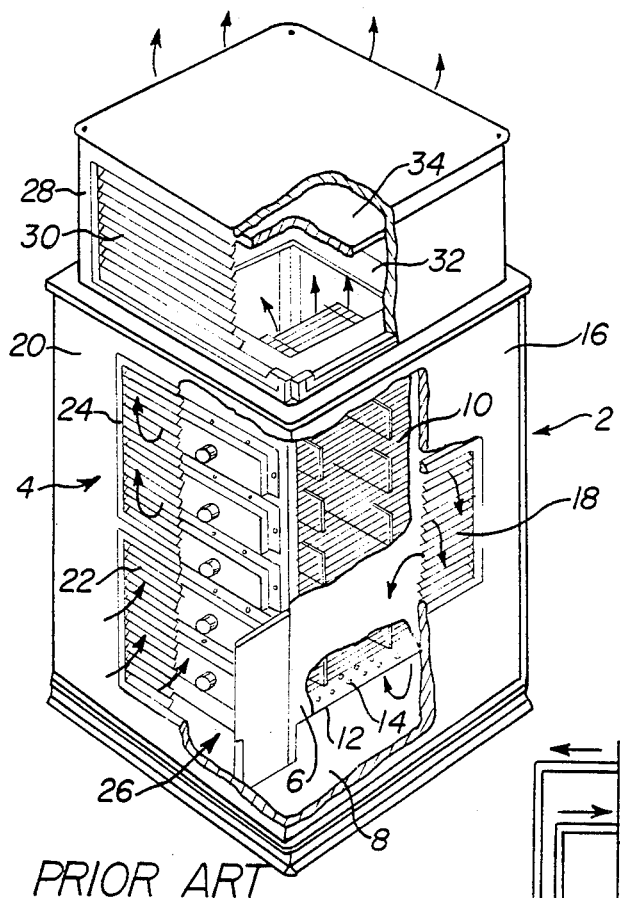
FIG. 1 is a cut-away perspective view of a hydrogen recombiner in accordance with that known in the art.

Referring to FIG. 1, there is shown therein a hydrogen recombiner 2, as known in the art, that comprises an outer housing 4 and an inner housing 6 fixedly mounted, by means not shown, above the floor 8 of outer housing 4. Mounted within inner housing 6, by means not shown, are electric heaters 10. The base 12 of inner housing 6 is provided with spaced, dispersed orifices 14. Wall 16 of outer housing 4, as well as the remaining parallel wall thereof that cannot be seen in FIG. 1, are provided with louvers 18 through which containment gases enter hydrogen recombiner 2 to be burned therein. The remaining wall 20 of outer housing 4, as well as the remaining parallel wall thereof that cannot be seen in FIG. 1, are provided with lower louvers 22 and upper louvers 24 that communicate with similar closed chambers 26 that are sealed off from the remainder of the hydrogen recombiner but which are adjacent to electric heaters 10. The upper end of hydrogen recombiner is provided in wall 28 thereof, as well as in the remaining walls that cannot be seen in FIG. 1 with louvers 30. Disposed above electric heaters 10 is a baffle plate 32 and a distribution plate 34.

In operation, the electric heaters 10 are always on, with power sufficient to raise the temperature of a gaseous mixture containing hydrogen and oxygen to its ignition temperature. By heat of convection from electric heaters 10, gases, whether they contain hydrogen or not, are drawn continuously through outer housing 4 through louvers 18, and then upwardly through orifices 14 into contact with electric heaters 10. The heated gases move upwardly and are funneled by baffle plate 32 into contact with distribution plate 34, which then uniformly directs the heated gas to louvers 30 for discharge from the hydrogen recombiner. When hydrogen is present in the entering gases, the same flow pattern prevails except that the electric heaters 10 raise the temperature of the gaseous mixture to its ignition temperature, hydrogen is converted by oxidation to water vapor and the resultant recombined gases are then removed from the hydrogen recombiner as above. During operation of hydrogen recombiner 2, air at ambient temperature, it continuously drawn into closed chambers 26 by convection through lower louvers 22 and then are discharged therefrom through upper louvers 24. This provides some cooling in the adjacent electric heaters 10. When containment gases containing up to about 4 volume percent are normally burned, cooling of the recombined gases occurs in the upper portion of the hydrogen recombiner of FIG. 1 sufficient to cool the gases below the ignition temperature of the containment gases before passing outwardly through louvers 30 into the containment zone.

The novel apparatus herein is similar to that described above, except that in place of the upper end of the hydrogen recombiner 2, there is provided a heat-exchange unit for cooling the gases, after they have been heated to their ignition temperature by electric heaters 10 and reaction resulting in the conversion of hydrogen to water vapor has taken place, with the temperature of the resultant gaseous mixture thereby being raised to a temperature above said ignition temperature, being cooled to a temperature below said ignition temperature prior to discharge.

Figure 2:
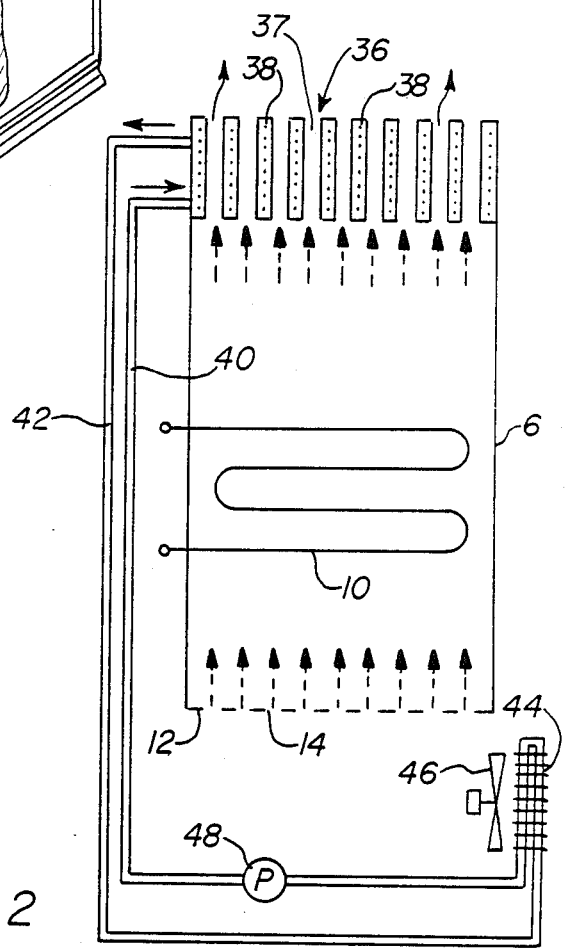
FIG. 2 is a schematic diagram of one embodiment of our novel apparatus showing one heat-exchange means for cooling the exit recombined gases.

The heat-exchange unit used is not critical as long as it is sufficient to cool the recombined gaseous mixture to a temperature below their ignition temperature prior to their discharge from the hydrogen recombiner. One embodiment for doing this is shown in FIG. 2, wherein there is disposed a heat exchanger 36 provided with continuous tubing or coils 38 communicating with inlet pipe 40 and exit pipe 42 carrying any suitable heat exchange medium, such as water. Cool water enters heat exchanger 36 by line 40, cooling the recombined gaseous mixture as it passes therethrough and outwardly through exits 37 of the hydrogen recombiner 2 to a temperature below its ignition temperature. The water that has been heated as a result thereof is withdrawn from heat exchanger 36 by line 42, and cooled by any suitable means, for example, by passage through a water cooler 44 wherein heat is removed therefrom by using fan means 46 to blow cool air thereover. The cooled liquid then passes through pump 48 to continue the cooling cycle.

Figure 3:
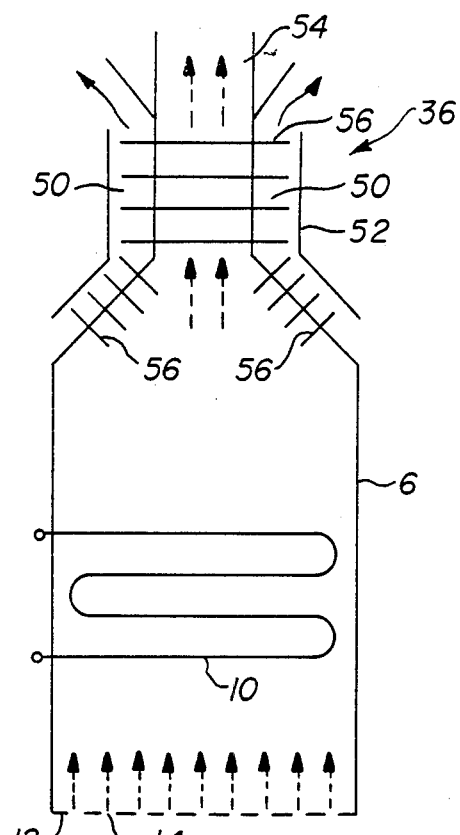
FIG. 3 is a schematic diagram of another embodiment of our novel apparatus showing another means for cooling the exit recombined gases.

In the embodiment of FIG. 3, the hydrogen recombiner 2 is provided with passageways 50, formed by encircling spaced walls 52, surrounding an exit passage 54. Disposed in passageways 50 and extending into the upper portion of hydrogen recombiner 2 and into exit passage 50 are sealed heat pipes 56 containing a porous, flowable material that can absorb heat and can also release said absorbed heat. Passageways 50 communicate at the lower end thereof with the atmosphere external of hydrogen recombiner 2. As a result of convection, gaseous mixtures surrounding the hydrogen recombiner 2 will move upwardly through passageways 50, picking up heat transferred through the walls of the hydrogen recombiner. Additional heat is transferred to the gaseous mixture by heat convection through pipes 56. Thus, when the gaseous mixture is discharged from passageways 50, it has absorbed an appreciable amount of heat from the recombined gases, thereby cooling the same below their ignition temperature.

Figure 4:
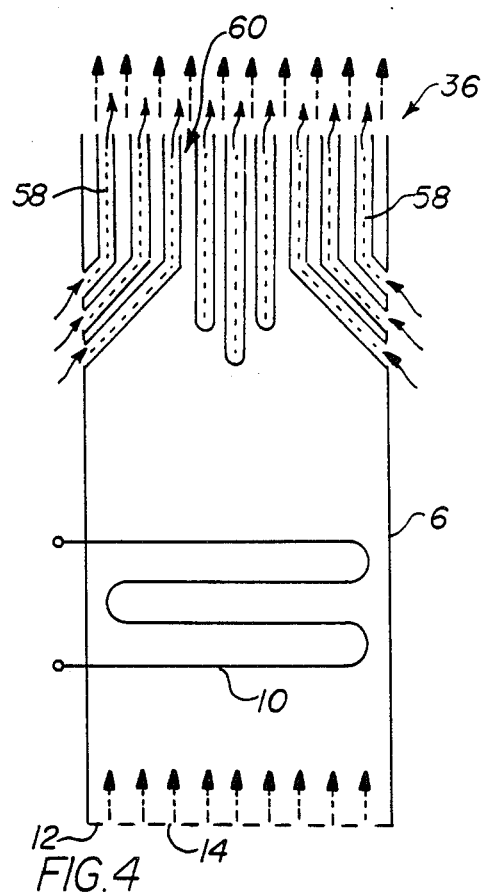
FIG. 4 is a schematic diagram of a third embodiment of our novel apparatus showing still another heat-exchange means for cooling the exit recombined gases.

The embodiment of FIG. 4 is somewhat similar to FIG. 3, except that heat pipes are not used but a larger number of tubes 58 are employed extending externally of hydrogen recombiner 2 into the exit passage of hydrogen recombiner and upwardly and outwardly through the exit 60 thereof. Tubes 58 communicate at each end thereof with the atmosphere external of hydrogen recombiner 2. Here, too, heat from the recombined gases is transferred to the gases passing upwardly through tubes 58, resulting in cooling the recombined gases below their ignition temperature.

The hydrogen recombiner described herein is always in operation as long as the nuclear power plant is in operation, and containment gases are continuously passed therethrough. Normally, the containment gas is atmospheric air and will contain from about 100 to about 2000 parts per million by weight of hydrogen. In the event a problem arises and the hydrogen content of the containment gases rises to about 4 volume percent, the hydrogen recombiner can easily convert substantially all of the hydrogen therein by reaction with oxygen in the containment gases to form water, and cool the same below the ignition temperature. Thus, there is no problem when the containment gases are discharged from the hydrogen recombiner, since no possibility of spontaneous ignition of containment gases exists.

However, in the event the hydrogen content of the containment gases rises above about 4 volume percent, for example, above about 5 volume percent, and especially up to about 8 to 10 volume percent, it becomes extremely difficult for the hydrogen recombiner to cool the exit gases sufficiently. Since the exit gases may be at a temperature in excess of their ignition temperature, spontaneous ignition of the containment gases can occur outside of the hydrogen recombiner, obviously creating serious problems in the containment area. By employing the novel apparatus herein and following the defined novel procedure herein, we can safely and effectively handle containment gases containing as high as about 8 to 10 volume percent of hydrogen without incident.

The containment gases being treated normally contain from about 100 to 200 parts per million of hydrogen, which in the event of a build up, can rise to about 8 to 10 volume percent. The containment gases will be at a temperature of about ambient temperature to about 80° C., generally about ambient temperature to about 55° C., and a pressure of about ambient pressure to about 150 pounds per square inch gauge. As a result of the heat produced by the electric heaters 10, containment gases are continuously drawn by convection into hydrogen recombiner 2 by way of louvers 18, through orifices 14 and then upwardly through electric heaters 10 where they are heated to their ignition temperature. The rate of flow of containment gases through the electric heaters 10 will vary over a wide range, but, in general, will be in the range of about 50 to about 150 standard cubic feet per minute. As the containment gases pass over electric heaters 10, their tempeature is raised to their ignition temperature, which can be in the range of about 570° to about 590° C., but usually about 575° to about 580° C. Reaction of hydrogen in the containment gases with the oxygen will then occur to form water vapor, with the result that the temperature of the resulting, or recombined gases, where 8 to 10 volume percent hydrogen is present in the containment gases could be raised to a temperature level in excess of said ignition temperature, for example, a temperature of about 610° C. to 640° C.

In accordance with out invention herein, the recombined gases are cooled by any suitable means, but preferably by one of the means described herein, more particularly using the embodiment exemplified in FIG. 2, wherein the recombined gases are contacted in a heat exchanger through which a cooling liquid is passed, wherein they are cooled to a temperature below about 570° C., generally between about 480° to about 540°, or in other words below said ignition temperature. Since the cooled recombined gases are now below their ignition temperature, they can be safely discharged from the hydrogen recombiner, for there will be no chance of spontaneous ignition thereof externally of the hydrogen recombiner.

We claim:

1. In a process wherein containment gases from a nuclear power plant comprising a mixture of hydrogen and air are heated to their ignition temperature of about 570° to about 590° C. in a hydrogen recombiner to convert hydrogen by oxidation to water vapor, the temperature of the resultant gaseous mixture thereby rising to a level in excess of said ignition temperature and the resultant gaseous mixture is then discharged from said hydrogen recombiner, the improvement which comprises reducing the temperature of said resultant gaseous mixture after said heating below said ignition temperature, without mixing the resultant gaseous mixture with said containment gases, prior to such discharge.

2. The process of claim 1 wherein said containment gases being heated contain up to about 10 volume percent of hydrogen.

3. The process of claim 2 wherein said containment gases being heated contain from about 5 to about 10 volume percent of hydrogen.

4. The process of claim 1 wherein said containment gases being heated are at a temperature in a range of about ambient temperature to about 80° C.

5. The process of claim 4 wherein said containment gases being heated are at a temperature in a range of about ambient temperature to about 55° C.

6. The process of claim 1 wherein said containment gases are passed through said hydrogen recombiner at a flow rate of about 50 to about 150 standard cubic feet per minute.

7. The process of claim 1 wherein said containment gases are heated to an ignition temperature in the range of about 570° to about 590° C.

8. The process of claim 7 wherein said containment gases are heated to an ignition temperature in the range of about 575° to about 580° C.

9. The process of claim 1 wherein said resultant gaseous mixture is cooled after said heating and prior to said discharge to a temperature below about 570° C.

10. The process of claim 9 wherein said resultant gaseous mixture is cooled after said heating and prior to said discharge to a temperature in the range of about 480° to about 540° C.

11. In a process wherein containment gases from a nuclear power plant that are at a temperature in the range of about ambient temperature to a temperature of about 80° C., said containment gases comprising a mixture of air and up to about 10 volume percent hydrogen, are passed through a hydrogen recombiner at a flow rate of about 50 to about 150 standard cubic feet per minute and are heated therein to their ignition temperature of about 570° to about 590° to convert hydrogen by oxidation to water vapor, and the resultant gaseous mixture is then discharged from said hydrogen recombiner, the improvement which comprises reducing the temperature of said resultant gaseous mixture after said heating to a temperature below about 570° C., without mixing the resultant gaseous mixture with said containment gases, prior to such discharge.

12. The process of claim 11 wherein said containment gases being heated contain from about 5 to about 10 volume percent hydrogen and are at a temperature in the range of about ambient temperature to about 55° C., said ignition temperature is in the range of about 575° to about 580° C., and said resultant gaseous mixture is cooled to a temperature in the range of about 480° to about 540° C. prior to said discharge.

13. A hydrogen recombiner including a housing containing electric heaters therein for heating containment gases from a nuclear power plant comprising a mixture of hydrogen and air, flowing upwardly through the housing, to their ignition temperature of about 570° to 590° C. to convert hydrogen by oxidation to water vapor, the temperature of the resultant gaseous mixture thereby rising to a level in excess of said ignition temperature, means on said housing above said electric heaters for cooling the resultant gaseous mixture after said heating to a temperature below said ignition temperature, means on said housing above said electric heaters for cooling the resultant gaseous mixture after said heating to a temperature below said ignition temperature, without mixing the resultant gaseous mixture with said containment gases, and means for discharging the cooled resultant gaseous mixture from the hydrogen recombiner.

14. The apparatus of claim 13 wherein said cooling means comprises a heat exchange unit.

15. The apparatus of claim 14 wherein said heat exchange unit comprises coils disposed in said discharge means, means to pass a cooling heat transfer medium through said coils, means to remove hot heat transfer medium from said coils, means to cool said hot heat transfer medium, and means to return the resulting cooled heat transfer medium to said coils.

16. The apparatus of claim 14 wherein said heat exchange unit comprises tubes extending into said discharge means and upwardly through the discharge end of said discharge means, said tubes communicating at each end thereof with the atmosphere external of said hydrogen recombiner through which containment gases external of said hydrogen recombiner can move by convection upwardly therethrough.

17. The apparatus of claim 14 wherein said heat exchange unit comprises passageways surrounding said discharge means communicating at each end thereof with the atmosphere external of said hydrogen recombiner through which containment gases external of said hydrogen recombiner can move by convection upwardly therethrough and closed heat pipes containing a porous, flowable material disposed in said discharge means and extending into said passageways for removing heat from said resultant gaseous mixture.

* * * * *